Nov. 12, 1968   B. D. SIMPSON ET AL   3,410,906
PROCESS OF SEPARATING AMINES
Filed Oct. 15, 1965

INVENTORS
A.M. SCHNITZER
B.D. SIMPSON
BY
Young & Quigg
ATTORNEYS 3,410,906
PROCESS OF SEPARATING AMINES
Billy D. Simpson and Anton M. Schnitzer, Bartlesville, Okla., assignors to Phillips Petroleum Company, a corporation of Delaware
Filed Oct. 15, 1965, Ser. No. 496,305
10 Claims. (Cl. 260—585)

ABSTRACT OF THE DISCLOSURE

Saturated hydrocarbyl amines are separated from a reaction mixture comprising unreacted saturated hydrocarbyl halide, unreacted amination reagent, alcohol solvent, saturated hydrocarbyl amine, olefins, and the acid salt of the saturated hydrocarbyl amine by flashing off unreacted amination reagent, and liberating the free saturated hydrocarbyl amine product from said acid salt by dilution with water or neutralization of the acid salt of the amine product with a compound selected from the group consisting of ammonia, and low molecular weight primary, secondary, and tertiary amines.

---

The present invention relates to the production of amines. In one aspect the invention relates to the preparation of amines by the amination of hydrocarbyl halides. In another aspect, this invention relates to a novel recovery process whereby the amines thus produced are separated from the reaction mixture. Yet another aspect of this invention relates to a process for the preparation of long-chain alkyl amines.

The synthesis of long-chain alkyl amines has been of particular interest to the prior art. Long-chain aliphatic amines and amine derivatives have a number of commercial uses. Most of these materials are presently produced from animal fats and vegetable oils. Long-chain fatty acids made by the hydrolysis of fats are converted to their ammonium salts which are then dehydrated to the corresponding nitriles. These nitriles are then hydrogenated whereby the amines resulting from such hydrogenation are mixtures of homologous primary amines with the chain lengths depending on the source of the starting fatty acid. For example, the product obtained from tallow is a mixture of about 2 percent $C_{14}$, 24 percent $C_{16}$, 28 percent $C_{18}$ saturated amine and 46 percent $C_{18}$ unsaturated amines. The big disadvantage in this type of a process for making these long-chain alkyl amine compounds is that the amines derived from natural fats and oils have the amine group in the terminal or 1-position. The present invention is directed to a process which reacts a chlorinated paraffin with ammonia to produce a product which is a mixture of position isomers with the amine group on various carbon atoms along the chain. After the reaction has proceeded as far as possible under predetermined controlled conditions, these long-chain alkyl amines remain in solution in supernatant fluid in the form of salts. Under the prior art it was the opinion that a strong inorganic base was necessary to liberate the amine because such a base will not form reversible salts with the hydrochloric acid which is a by-product of the reaction.

Therefore, it is an object of the present invention to teach a manner in which ammonia can be used to liberate the free amine in a reaction of a saturated hydrocarbyl halide with ammonia.

Another object of this invention is to teach a manner in which methanol can be used to extract the free amine from the reaction mixture formed on reacting a saturated hydrocarbyl halide with ammonia.

Yet another object of this invention is to teach an improved method for recovering long-chain alkyl amines in high yields.

Figure 1:
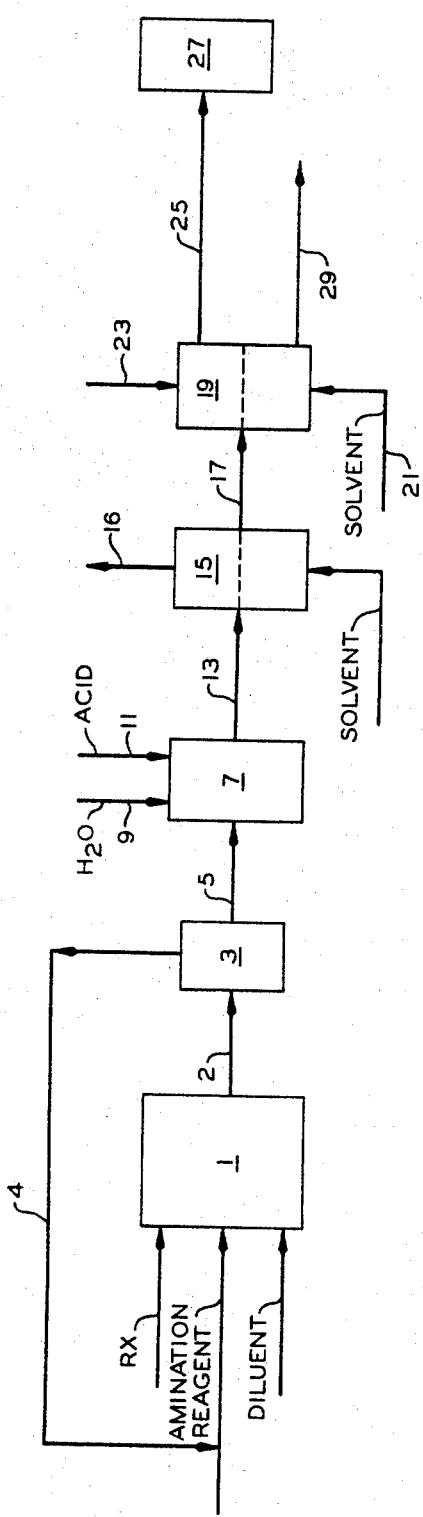
Figure 2:
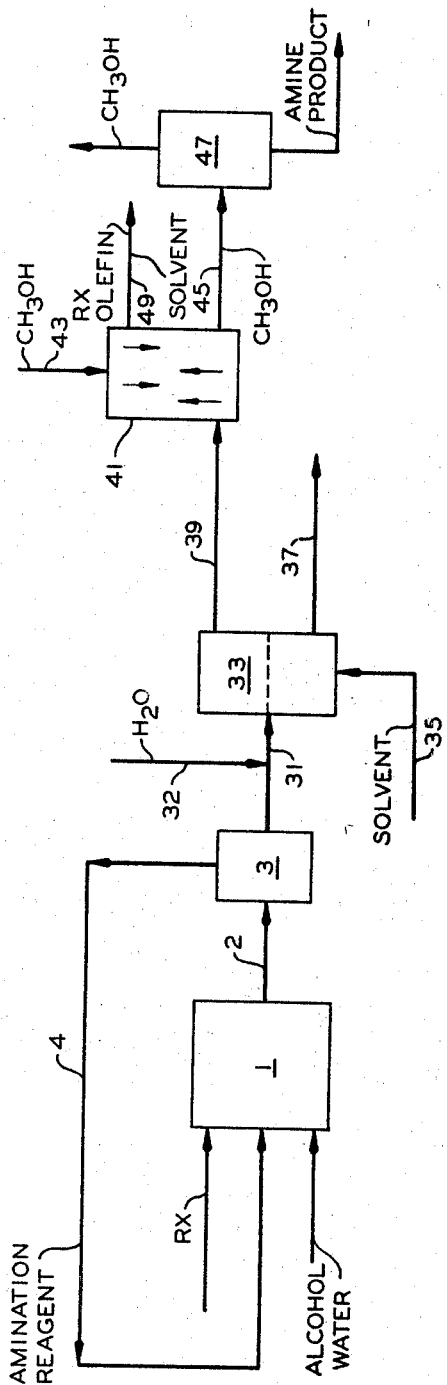

The manner in which these objects and many of the attendant advantages of this invention have been attained will be evident from a reading of the following specification, in the light of the attached flow sheet in which FIGURES 1 and 2 constitute a diagrammatic representation of the performance of the steps employed in the novel recovery of the product amines from the reaction mixture.

In accordance with this invention, a saturated hydrocarbyl halide is reacted with one from a group consisting of ammonia, a primary amine and a secondary amine, in an alcoholic or aqueous alcoholic solution. Essentially all of the unreacted ammonia or amine reactant is flashed off together with part of the solvent; the remaining mixture is neutralized or made slightly acidic with an acid. Thereafter, the reaction mixture consisting of the reaction product present as the hydrohalide thereof; unconverted hydrocarbyl halide; hydrocarbon diluent if used; olefin and ether by-products is mixed with a hydrocarbon solvent to form a hydrocarbon phase and an aqueous alcoholic phase, and the free amines are then liberated from the produced amine salts in the alcoholic phase by treatment with a weak base comprising either ammonia or an amine of low molecular weight in an amount at least sufficient to liberate all of the produced amines from their salts, the liberated produced amines being separated as a separate phase either by dilution with water or by extraction with a hydrocarbon solvent or by a combination of dilution and extraction.

The improvement advanced by the present invention relates to the extraction of the amine product from this reaction mixture after neutralization with either ammonia or an amine of low molecular weight such as primary, secondary, or tertiary amines have up to about 6 carbon atoms, preferably having not more than 4 carbon atoms. Ammonia and such amines are traditionally considered as being weak bases in the prior art. We have surprisingly discovered that although ammonia is less basic than the produced amines, the ammonia is nevertheless capable of liberating the produced amines from their salts. It appears that this unexpected liberation of the produced free amines results from an equilibrium of the produced free amines and an ammonium salt with the produced amine salts and free ammonia. The free amines are extracted into the organic phase and thereby shift the equilibrium toward the formation of additional quantities of produced free amines. This phenomenon can be represented graphically by the following equation:

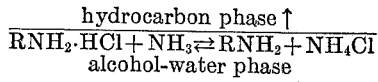

$$\frac{\text{hydrocarbon phase} \uparrow}{RNH_2 \cdot HCl + NH_3 \rightleftarrows RNH_2 + NH_4Cl}$$
alcohol-water phase In an alternative method, when the reaction is carried out in an alcohol or aqueous alcohol solvent, the reaction mixture is diluted with water and the non-aqueous phase is combined with an extract of the aqueous phase obtained by extraction of the aqueous phase with a hydrocarbon solvent. The product amines are then separated from the solvent mixture by extraction with a selective solvent such as methanol.

Referring to the flow diagram of FIGURE 1 by reference characters, (hereinafter as defined) RX, an amination reagent being one selected from the group consisting of ammonia and primary and secondary amines having 1-3 carbon atoms, and an alcoholic or aqueous alcoholic diluent mixture are fed to reactor 1.

The molar ratio of amination reagent to hydrocarbyl halide generally will be within the range of about 2:1 to about 50:1, preferably being within the range of about 5:1 to about 20:1.

The ratio of amination reagent to the hydrocarbyl halide introduced into the reactor is dependent upon whether the operator desires to manufacture a product predominating in monoalkyl amine or whether he desires to produce a preponderance of di- or trialkyl amines. A large proportion of ammonia to alkyl halide favors the production of monoalkyl amine while a smaller portion of ammonia favors the production of di- and trialkyl amines. If a mixture containing a greater preponderance of monoalkyl amine is to be produced, a quantity of ammonia constituting from 6–10 times the theoretical quantity necessary to react with the alkyl halide should be introduced. The desired reactions which take place in the reactor may be described by the following equations illustrating the use of $NH_3$ as the amination reagent.

$$RX + NH_3 \rightarrow RNH_3X \qquad (I)$$

$$RNH_3X + RX + NH_3 \rightarrow R_2NH_2X + NH_4X \qquad (II)$$

$$R_2NH_2X + RX + NH_3 \rightarrow R_3NHX + NH_4X \qquad (III)$$

where R represents a monovalent saturated hydrocarbyl radical selected from the group consisting of alkyl, cycloalkyl, cycloalkylalkyl and alkylcycloalkyl, X is a halogen selected from the group consisting of chlorine and bromine and wherein the number of carbon atoms in said saturated hydrocarbyl halide is within the range of 4–25. The following incidental reactions also occur, as illustrated below in the case of isopropyl alcohol diluent:

$$\underset{\underset{\text{OH}}{|}}{CH_3CHCH_3} + RX + NH_3 \longrightarrow \underset{\underset{\text{O}}{|}}{CH_3CHCH_3} + NH_4X \qquad (IV)$$

$$RX + NH_3 + H_2O \rightarrow ROH + NH_4X \qquad (V)$$

$$RX + NH_3 \rightarrow NH_4X + \text{olefin} \qquad (VI)$$

It will thus be seen that in the case of the manufacture of alkyl amines by reaction of alkyl chlorides with ammonia in the presence of an alcohol, for example isopropyl alcohol, the reaction mixture in the reactor 1 contains at the conclusion of the reaction, in addition to certain quantities of the starting materials, $$ROH; NH_4X; \underset{\underset{\text{O}}{|}}{\underset{|}{R}} \atop CH_3CHCH_3$$

olefin; $RNH_3X$; $R_2NH_2X$; and $R_3NHX$.

The volume ratio of alcoholic or aqueous alcoholic solvent to hydrocarbyl halide is not critical but generally will be within the range of about 0.2–10, usually within the range of about 0.4–5. The reaction temperature generally will be within the range of about 125–300° C., usually being within the range of about 175–250° C. The reaction time generally will be within the range of about 0.1–10 hours, usually being within the range of about 0.5–5 hours. The reaction is conveniently carried out under autogenous pressure, for example a pressure such as about 500–3000 p.s.i.g.

The reaction mixture containing amine hydrohalides, unreacted hydrocarbyl halide, ammonia, olefin and ether by-products, ammonium halide and alcoholic or aqueous alcoholic solution is passed through conduit 2 to a flash zone 3, wherein the unreacted amination reagent is distilled from the reaction mixture and recycled back to the reactor through line 4. The bottoms from this flash drum is passed through line 5 to a neutralizing vessel 7 to which water is added through line 9 if desired and acid is added through line 11 in order that the amine reaction product be neutralized or made slightly acidic. Suitable acids for use in the neutralization of the reaction mixture are hydrochloric, sulfuric, nitric, phosphoric, and the like. It is preferable, and with some solvents necessary, that water be added to the reaction mixture through line 9.

The acidified mixture is passed through line 13 to a separator 15 to which is added a hydrocarbon solvent containing from 5 to 12 carbon atoms such as pentane, hexane, heptane, cyclohexane, dodecane, methylcyclopentane, benzene, toluene, and the like. In addition thereto other solvents such as diethyl ether can be used.

The mixture in separator 15 separates into an upper oily layer and a lower aqueous layer. The aqueous layer consists principally of the amine product in the form of its salts, alcohol, and water, while the oily layer contains the unreacted alkyl halides, any alkyl ethers and olefins which may be present, and some alcohol. The oily layer is removed through line 16.

The aqueous phase is then passed through line 17 into a second separator 19 to which is added through line 21 additional hydrocarbon which is selected from the same group as those employed in separator 15. A different hydrocarbon than was used in the first separation can be employed if desired.

Ammonia or a low molecular weight amine is also added to this separator through line 23. As the free alkylamine product is formed, it is dissolved in the oil phase and the ammonium salts or salt of the low molecular weight amine, and alcohol are dissolved in the aqueous phase. The oily layer in separator 19 containing the amine product is removed from that separator through line 25 into a distillation column 27 where the amine product is separated and dried. The aqueous alcohol phase is passed through line 29 to a recovery zone for separation and recovery of the individual constituents. The recovered alcohol may be subsequently passed to a storage tank for reuse in the practice of the process.

FIGURE 2 describes a second embodiment for recovering the amine product from the reaction mixture formed in reactor 1. This method of separation is employed when an alcohol or alcohol-water system is used in reactor 1. We have discovered that the amine product in an alcohol or alcohol-water system is present as the free amine in the presence of excess ammonia, and may readily be separated along with other organic products by dilution with water.

This alcohol or alcohol-water solvent containing the amine product, unreacted alkyl halide, and some by-product olefin and ether material is passed from the reactor 1 through conduit 2 into chilled flash zone 3 wherein the mixture is cooled to room temperature and the excess amination reagent (above that soluble at room temperature and atmospheric pressure) is flashed from the mixture and recycled through conduit 4 to reactor 1. The mixture is further diluted with water from line 32 in conduit 31 and passed into separator 33. A suitable hydrocarbon solvent which is from the same group of solvents used in separators 15 and 19 is added to separator 33 through conduit 35. The amine product, olefin and ether by-products, and unreacted alkyl halide separate from the alcohol-water phase into the oil phase. The water, ammonium halide by-product and alcohol pass from the separator through line 37 to a separation and recovery unit not shown where the alcohol and ammonia or amine are recovered just as in Embodiment I.

The oil phase containing the amine product, olefin and ether by-products, unreacted alkyl halide, and solvent, is passed through conduit 39 to an extractor 41 wherein a selective extractant, such as methyl alcohol, is added through conduit 43 at the top of the extractor. The methyl alcohol selectively extracts the alkyl amine from the mixture, and this solution is passed through line 45 to distillation zone 47 where the amine and methyl alcohol are separated. The olefin, alkyl halide, ether and solvent oily phase is passed through conduit 49 to suitable apparatus for separating the various components. It is preferred that the methyl alcohol flow in countercurrent relationship with respect to the mixture in extractor 41.

The following examples are offered to demonstrate the recovery of dodecyl amines from a reaction of isomeric monochlorododecanes with anhydrous ammonia.

A mixture of 102.4 grams (0.50 mol) of isomeric monochlorododecanes (obtained from the chlorination of n-dodecane), 85 grams (5.00 mols) of anhydrous ammonia, 130 ml. of solvent (comprising 80 percent by weight of isopropyl alcohol and 20 percent by weight of water)

and 0.3 gram of Calgon, a sodium phosphate glass used as a corrosion inhibitor) was heated to 200° C., with stirring, for 2 hours. The reaction mixture was cooled and passed into a flash zone and the reactor was rinsed with additional isopropyl alcohol-water mixture, which was added to the material charged to the flash zone. The ammonia was distilled from the reaction mixture. The mixture was then neutralized with HCl until the mixture was just acidic to litmus. Water was also added to the neutralizer. The unreacted monochlorododecane and olefin by-product was separated from the amine reactant by extraction with three 100-ml. portions of heptane. The combined heptane extracts were washed with three 50-ml. portions of water; and the water washings were added to the water-alcohol layer. The heptane was removed from the heptane solution through the use of a rotary film evaporator, giving as a residue 19.0 grams of material composed primarily of by-product olefins and unconverted monochlorododecanes. Titration of a sample of this residue with perchloric acid in acetic acid showed the residue contained 0.004 equivalent amines, constituting 1.2 mol percent of the total amines produced.

The acidified alcohol-water layer was treated with 23 grams (1.35 mols) of anhydrous ammonia, and the resulting mixture was then extracted with three 100-ml. portions of heptane. The combined heptane extracts were washed with three 100-ml. portions of water. The heptane was removed from the heptane solution through use of a rotary film evaporator, giving as a residue 73.4 grams of material composed primarily of monododecylamine. Titration of samples of this residue with perchloric acid in acetic acid showed the residue contained 0.322 equivalent of monododecylamine, constituting 98.8 mol percent of the total amine produced. The yield of total monododecylamine produced in the reaction was 65.2 percent of theory, based on the monochlorododecane charged.

By way of illustration of FIGURE 2, a mixture of 102.4 grams (0.50 mol) of monochlorododecanes (from the chlorination of n-dodecane), 85 grams (5.00 mols) of anhydrous ammonia, 130 ml. of solvent comprising 80 percent by weight of isopropyl alcohol and 20 percent by weight of water, and 0.3 gram of Calgon (a sodium phosphate glass), is heated to 200° C. with stirring for 2 hours. The reaction mixture is cooled and the ammonia is flashed from it. Water (500 ml.) is added to the residue and this mixture is extracted with three 100-ml. portions of n-heptane. The combined heptane extracts are then washed with three 50-ml. portions of water. Titration of a sample of the heptane solution shows it contains 0.313 equivalent of monododecyl amine. The heptane solution also contains unreacted olefins produced as by-products and unreacted monododecylchloride. This heptane fraction is extracted with methanol by countercurrent contacting. The alcohol-water containing some ammonium chloride passes to a distillation zone (not shown) where the alcohol is recovered in the same manner as in Example I. Sufficient methanol is used to extract 0.282 equivalent of dodecylamines, constituting 90 percent of the total amines produced.

Similar runs in which sodium hydroxide was used to convert the amine hydrochlorides to free amines gave the amines in yields of 64.8 and 67.8 percent of theory, based on the monochlorododecanes charged. Thus, the efficiency with which ammonia freed the amines from their hydrochloride salts or the efficiency with which the methanol extracted the amines from the olefin and unreacted alkyl chloride was as good within the experimental error as that obtained through the use of caustic.

While specific illustrations have been above set forth for the illustration of the practice of the invention, it is to be understood that this has been done for purposes of illustration merely, and that the scope of this invention is not limited in any way thereby.

Obviously, many modifications and variations of the present invention are possible in the light of the above teachings. It is therefore to be understood that within the scope of the appended claims the invention may be practiced otherwise than as specifically described herein.

We claim:
1. In the process of producing saturated hydrocarbyl amines by reacting saturated hydrocarbyl halides selected from the group consisting of saturated hydrocarbyl chlorides and saturated hydrocarbyl bromides having from 4 to 25 carbon atoms per molecule with an amination reagent in the presence of an alcohol solvent and at a temperature sufficient to form a reaction mixture comprising saturated hydrocarbyl amine, the acid salt of the saturated hydrocarbyl amine, olefins, unreacted saturated hydrocarbyl halide, and unreacted amination reagent; the improvement comprising separating the saturated hydrocarbyl amine from the reaction mixture which comprises the steps of flashing off unreacted amination reagent; acidifying the reaction mixture with a mineral acid selected from the group consisting of hydrochloric, phosphoric, and sulfuric acids; diluting the reaction mixture with water to form an alcohol-water phase; extracting the olefin and unreacted saturated hydrocarbyl halide from the alcohol-water phase with a low molecular weight hydrocarbon having 5 to 12 carbon atoms per molecule; liberating the saturated hydrocarbyl amine from the acid salt of the saturated hydrocarbyl amine by adding to the alcohol-water phase a base selected from the group consisting of ammonia, and low molecular weight primary, secondary, and tertiary amines; extracting saturated hydrocarbyl amine from the alcohol-water phase with said hydrocarbon; and recovering the saturated hydrocarbyl amine from said hydrocarbon by distillation.

2. The process according to claim 1 wherein the amination reagent is selected from the group consisting of ammonia, and primary or secondary amines containing 1 to 3 carbon atoms per molecule, and said alcohol solvent also contains water.

3. The process according to claim 2 wherein said saturated hydrocarbyl amines are compounds having at least one of the general formulae: $RNH_2$, $R_2NH$, and $R_3N$ wherein R represents a monovalent saturated hydrocarbyl radical selected from the group consisting of alkyl, cycloalkyl, cycloalkylalkyl, and alkylcycloalkyl, having 4 to 25 carbon atoms per molecule; and said saturated hydrocarbyl halide has the formula RX wherein R is as defined above, and X is selected from the group consisting of chlorine or bromine.

4. The process according to claim 3 wherein the low molecule weight primary, secondary, and tertiary amines utilized to liberate the saturated hydrocarbyl amine from the acid salt of the saturated hydrocarbyl amine contain 1 to 6 carbon atoms per molecule.

5. In the process of producing monododecylamine by reacting monododecylchloride with ammonia in the presence of isopropyl alcohol-water solvent and at a temperature sufficient to form a reaction mixture comprising monododecylamine, monododecylamine hydrochloride, olefins, ammonium chloride, unreacted monododecylchloride, and unreacted ammonia; the improvement comprising separating the monododecylamine from the reaction mixture comprising the steps of flashing off the unreacted ammonia, acidifying the reaction mixture with HCl, extracting the olefin and the unreacted monododecylamine hydrochloride from the alcohol-water phase with heptane, liberating monododecylamine from the monododecylamine hydrochloride by adding to the alcohol-water phase ammonia, extracting the monododecylamine with heptane, and recovering the monododecylamine from the heptane by distillation.

6. In the process of producing saturated hydrocarbyl amines by reacting saturated hydrocarbyl halides selected from the group consisting of saturated hydrocarbyl chlorides and saturated hydrocarbyl bromides having from 4 to 25 carbon atoms per molecule with an amination reagent in the presence of an alcohol solvent and at a temperature sufficient to form a reaction mixture comprising saturated hydrocarbyl amine, the acid salt of the saturated hydrocarbyl amine, olefins, unreacted saturated hydrocarbyl halide, and unreacted amination reagent; the improvement comprising separating the saturated hydrocarbyl amine product from the reaction mixture which comprises the steps of flashing off the unreacted amination reagent, liberating the saturated hydrocarbyl amine from the acid salt of the saturated hydrocarbyl amine by diluting the reaction mixture with water, extracting the saturated hydrocarbyl amine, olefin, and unreacted saturated hydrocarbyl halide from the alcohol-water phase with a hydrocarbon having from 5 to 12 carbon atoms per molecule, extracting the amine from the olefin and unreacted saturated hydrocarbyl halide with methanol, and separating the amine from the methanol.

7. The process according to claim 6 wherein the amination reagent is selected from the group consisting of ammonia, and primary or secondary amines containing 1 to 3 carbon atoms per molecule, and said alcohol solvent also includes water.

8. The process according to claim 7 wherein said saturated hydrocarbyl amines are compounds having at least one of the general formulae: $RNH_2$, $R_2NH$, and $R_3N$ wherein R represents a monovalent saturated hydrocarbyl radical selected from the group consisting of alkyl, cycloalkyl, cycloalkylalkyl and alkylcycloalkyl, having 4 to 25 carbon atoms per molecule; and said saturated hydrocarbyl halide has the formula RX wherein R is as defined above, and X is selected from the group consisting of chlorine or bromine.

9. The process according to claim 7 further including the step of cooling said reaction mixture prior to flashing off the unreacted amination reagent.

10. In the process of producing dodecylamine by reacting dodecyl chloride with ammonia in the presence of an isopropyl alcohol-water solvent at a temperature sufficient to form a reaction mixture comprising dodecylamine product, dodecylamine hydrochloride, olefin, ammonium chloride, unreacted dodecylchloride, and unreacted ammonia; the improvement which comprises separating the dodecylamine from the reaction mixture comprising the steps of cooling the reaction mixture; flashing off the unreacted ammonia, liberating the dodecylamine from the dodecylamine hydrochloride by diluting the reaction mixture with water; extracting the dodecylamine product, olefin, and unreacted dodecylchloride from the alcohol-water phase with heptane; treating the heptane extract with methanol to extract the dodecylamine therefrom; and recovering the dodecylamine from the methanol extract.

No references cited.

CHARLES B. PARKER, *Primary Examiner.*

R. L. RAYMOND, *Assistant Examiner.*